Feb. 26, 1929.
I. H. KENDALL
1,703,241
COUPLING DEVICE FOR PIPES
Filed July 23, 1925
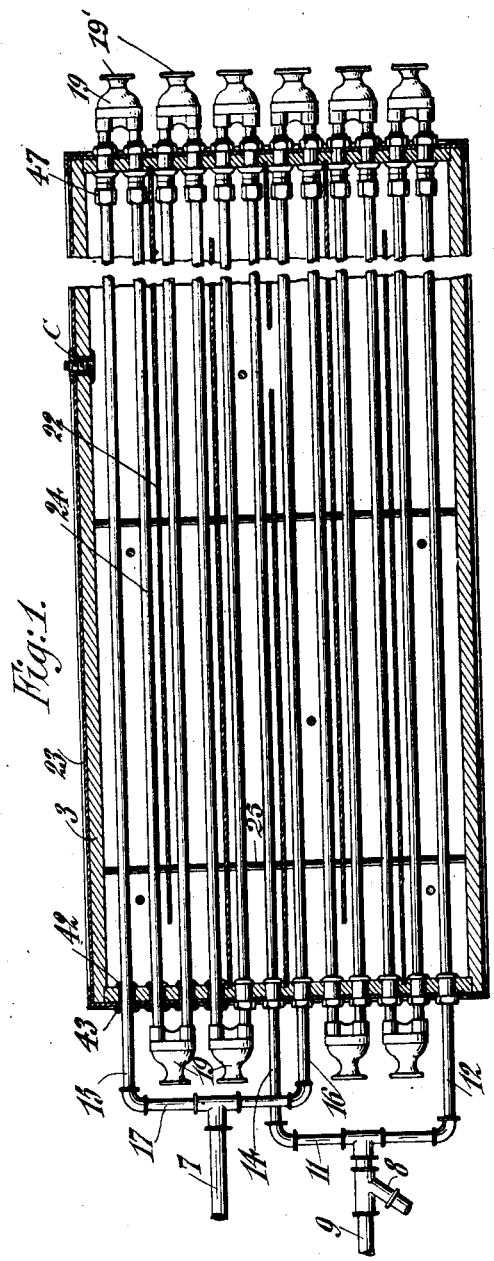
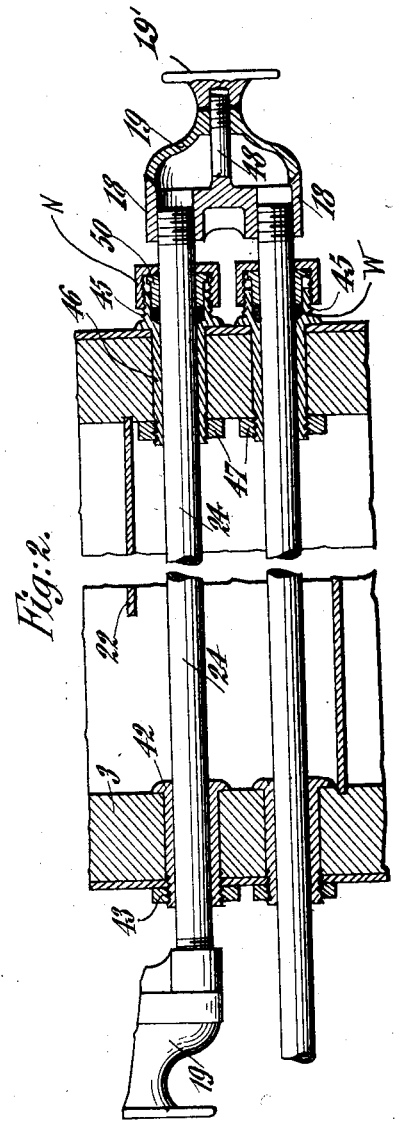
INVENTOR
Ira H. Kendall
BY
Mocker & Blum
ATTORNEYS.

Patented Feb. 26, 1929.

1,703,241

UNITED STATES PATENT OFFICE.

IRA H. KENDALL, OF POTSDAM, NEW YORK, ASSIGNOR TO THE KENDALL PATENTS, INC., OF POTSDAM, NEW YORK, A CORPORATION OF NEW YORK.

COUPLING DEVICE FOR PIPES.

Application filed July 23, 1925. Serial No. 45,466.

My invention relates to a new and improved coupling device for pipes.

One of the objects of my invention is to provide a new and improved coupling device for pipes which are associated in apparatus for pasteurizing milk or other fluids, or otherwise treating said fluids by means of heat. My invention is especially illustrated in connection with a heater intended for heating milk, in which it is necessary to couple the pipes together in a sanitary manner.

Other objects of my invention will be set forth in the following description and drawings which illustrate a preferred embodiment thereof, it being understood that the above-general statement of the objects of my invention is intended to generally explain the same and not to limit it in any manner.

Fig. 1 is a sectional view partially in elevation.

Fig. 2 is a detail sectional view partially in elevation.

The milk is forced through a series of pipes extending through the opposite walls of a heater 3 made of wood or the like and having a metal covering 23 made of galvanized iron or the like. The water in the tank 3 may be heated by any suitable means. The vertical pipe 11 is connected to the inlet pipes 8 and 9 through which milk to be heated can be forced by means of any suitable pumps. The vertical pipe 11 is connected to the upper horizontal inlet pipe 14 and the lower horizontal inlet pipe 12. These horizontal pipes 14 and 12 may be integral with or they may be suitably joined to the heater pipes 24 which are arranged in two series. As shown in Fig. 2, the heater pipes 24 are arranged in pairs which fit into coupling members 18. These coupling members 18 have sockets into which the externally threaded ends of the pipes 24 fit, and are connected in a liquid-tight manner by soldering or the like. While I prefer to connect the pipes 24 to the coupling members 18 by means of soldering, it is obvious that there are other equivalent methods of providing a tight sanitary connection without the use of objectionable packing material such as rubber or the like. The couplings 18 have threaded extension rods 48 and caps 19 are provided which have openings through which the ends of rods 48 project so that each said cap 19 can be forced tightly into the position shown in Fig. 2, to tightly close the couplings 18. The inner ends of the caps 19 have ground conical surfaces which fit tightly against the corresponding ground surfaces of the coupling members 18. The caps 19 are forced against the outer ends of coupling members 18 to form liquid-tight closures, by means of their corresponding ground surfaces, by means of the nut members 19' which cooperate with the threaded ends of extension rods 48. As can be seen in Fig. 2, the nut member 19' has a closed outer end and an internally threaded recess at its inner end. Said inner end of the nut member 19' makes a liquid-tight fit with the outer end of the cap 19. Hence the liquid which passes through the coupling does not have its taste or properties affected by any substantial contact with any rubber or other soft packing material. The pipes 24 are soldered to the coupling 18 so as to eliminate the necessity of using a soft packing material. The cap 19 is connected to the coupling 18 by means of a corresponding smooth conical surface so that no soft packing material is utilized at this point. Extension 48 of the coupling 18 fits snugly in the opening of the cap 19 so as to form a practically tight closure at this point. The milk entering through the upper horizontal inlet pipe 14 circulates through the six upper pipes 24 and then passes out through the pipe 15 into the vertical outlet pipe 17 and from there to the outlet pipe 7. The milk entering through the lower pipe 12 passes through the six lower pipes 24 and it then passes out through the pipe 16 and into the outlet pipe 7. The tank 3 can be provided with baffle plates 22, and rods 25 serve to connect the top and bottom walls of the heater 3. The heater 3 is provided with an opening C provided with a plug so that access can be conveniently had to the interior of the said tank.

One of the end walls of the heater is provided with a series of nipples 42 which are firmly held in place by the nuts 43 and through which the pipes 24 pass in a liquid tight manner. The other end wall of the tank is provided with a series of hollow nipples 46 held in place by nuts 47. The said nipples 46 have outer externally threaded ends 45. Slides 50 can be actuated by means of nuts N so as to compress the sleeves or washers W. This provides a stuffing box or gland for each end of each pipe 24 so as to allow for the expansion or contraction of the tank due to the changes in temperature thereof.

The joints between the pipes 24 and the nipples 42 can be made watertight in any suitable manner and if desired, by any suitable packing or connecting means. The nipples 42 can be immovably connected to the adjacent end wall of the tank 3, which for convenience may be designated as the first end wall. Hence, when the tank 3 expands or contracts because of changes in temperature, the packings W maintain a liquid-tight closure with the adjacent or second end wall of the tank, even though the second end wall has a relative movement with respect to the first end wall. Since the pipes 24 project beyond the packing devices associated with the second end wall of the tank, the closure provided by the coupling 18 and the associated parts is not affected by the expansion or contraction of the tank. In addition, the cap 19 can be removed to inspect and clean the pipes 24 without disturbing the coupling device.

I have not described in detail the heating system for heating the pipes through which the milk is forced, because any suitable or improved method of applying the heating liquid to the said pipes 24 can be utilized.

I have shown a preferred embodiment of my invention but it is clear that numerous changes and omissions could be made without departing from its spirit. Thus, while I have heretofore spoken of an apparatus whereby milk or other fluid is given a heat treatment, it is obvious that the construction herein is useful in connection with any tank having pipes passing through the walls thereof, and in which the tank is subjected to changes of temperature.

Hence, whenever I mention a heater in the description or claim herein I desire to include by this term any device of the type shown herein in which the liquid is either heated or cooled.

I claim:—

A coupling device for pipes comprising a coupling member having separated openings adapted to receive the ends of a plurality of pipes, said pipes being soldered to said coupling member, the outer end of said coupling member having a ground conical surface which tapers outwardly, a cap having a ground end adapted to abut said conical surface in a liquid-tight manner, said cap having an opening, said coupling member having an extension having an external threading and fitting snugly in said opening, and a nut member closed at its outer end and having an internally threaded recess at its inner end engaging said extension to clamp said cap in position.

In testimony whereof I affix my signature.

IRA H. KENDALL.